United States Patent [19]

Weldon et al.

[11] 4,200,831

[45] Apr. 29, 1980

[54] COMPENSATED PULSED ALTERNATOR

[75] Inventors: William F. Weldon; Mircea D. Driga; Herbert H. Woodson, all of Austin, Tex.

[73] Assignee: The United States of America as represented by the United States Department of Energy, Washington, D.C.

[21] Appl. No.: 930,616

[22] Filed: Aug. 3, 1978

[51] Int. Cl.² ............................................. H02K 39/00
[52] U.S. Cl. .......................................... 322/8; 322/100; 310/266; 315/289
[58] Field of Search .................... 310/111, 168, 266; 322/8, 47, 100; 315/289

[56] References Cited

U.S. PATENT DOCUMENTS

| | | | |
|---|---|---|---|
| 3,470,408 | 9/1969 | Lewis et al. | 310/266 X |
| 3,532,916 | 10/1970 | Fisher | 310/266 X |
| 3,569,791 | 3/1971 | Vogel | 322/100 X |
| 3,858,071 | 12/1974 | Griffing et al. | 310/266 |
| 4,166,966 | 9/1979 | Wittlinger | 310/111 |

Primary Examiner—Robert J. Hickey

Attorney, Agent, or Firm—R. V. Lupo; Stephen D. Hamel; Louis M. Deckelmann

[57] ABSTRACT

This invention relates to an electromechanical energy converter with inertial energy storage. The device, a single phase, two or multi-pole alternator with stationary field coils, and a rotating armature is provided. The rotor itself may be of laminated steel for slower pulses or for faster pulses should be nonmagnetic and electrically nonconductive in order to allow rapid penetration of the field as the armature coil rotates. The armature coil comprises a plurality of power generating conductors mounted on the rotor. The alternator may also include a stationary or counterrotating compensating coil to increase the output voltage thereof and to reduce the internal impedance of the alternator at the moment of peak outout. As the machine voltage rises sinusoidally, an external trigger switch is adapted to be closed at the appropriate time to create the desired output current from said alternator to an external load circuit, and as the output current passes through zero a self-commutating effect is provided to allow the switch to disconnect the generator from the external circuit.

12 Claims, 7 Drawing Figures

4,200,831

COMPENSATED PULSED ALTERNATOR

BACKGROUND OF THE INVENTION

This invention was made in the course of, or under, a contract with the Department of Energy.

There exists, particularly in the controlled thermonuclear fusion research community, but also in industry and the military, a need for short duration, high power pulses of electrical power usually including a requirement for energy storage. Traditionally, these needs have been met with electrostatic capacitors but the high cost and low energy density of such devices have prompted the search for more suitable and economical pulsed power supplies.

For the past five years the Center For Electromechanics of the University of Texas at Austin has participated in the above search, particularly in the development of pulsed homopolar generators. However, homopolar generators are inherently low voltage devices and have a limiting discharge time of milliseconds making them unsuitable for directly powering such devices as laser flashlamps and imploding liners.

Alternators have previously been used in the pulsed mode but have suffered the basic limitation that their relatively high internal impedance limits the rise time of the pulse they can generate.

The present invention was conceived to meet the above need and to overcome the limitations of the above prior devices in a manner to be described hereinbelow.

SUMMARY OF THE INVENTION

It is the object of the present invention to provide a device for producing short duration, high power pulses of electrical power including a requirement for energy storage for directly powering such devices as laser flashlamps.

The above object has been accomplished in the present invention by providing a single phase, two or multipole alternator comprising a nonmagnetic and electrically nonconductive armature rotor upon which is mounted a coil consisting of a plurality of power generating conductors, stationary field coils electromagnetically coupled to said rotor coil, and an external triggerable switch adapted to be closed at an appropriate time to create the desired output current from the alternator to an external load circuit. The alternator may also include a stationary or counterrotating compensating coil to increase the output voltage thereof and to reduce the internal impedance of the alternator at the moment of peak output.

DESCRIPTION OF THE PREFERRED EMBODIMENTS

Figure 1:
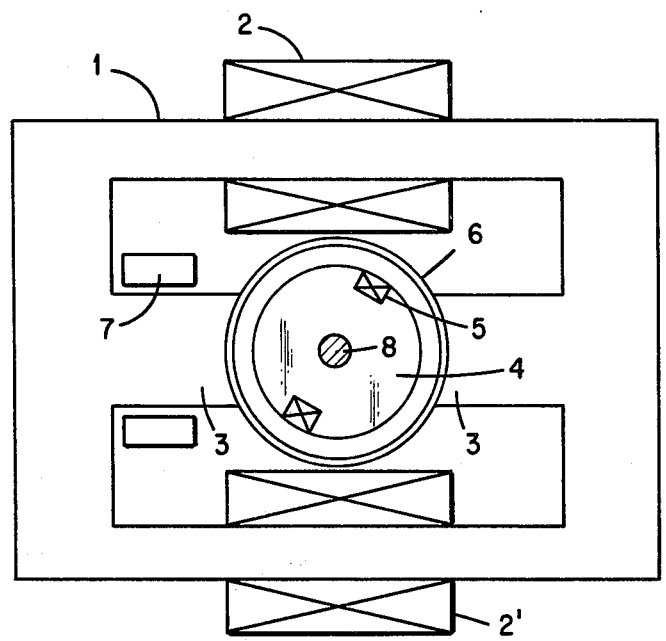
FIG. 1 is a schematic sectional view of the two-pole, single phase pulsed alternator of the present invention.

In the simplest form of the present invention, reference is now made to FIG. 1 of the drawings wherein a two-pole single phase alternator is illustrated. In FIG. 1, a stator 1 has a pair of field coils 2, 2' coupled thereto, and the stator is provided with a pair of pole-pieces 3. Reference numeral 7 illustrates an alternate field coil location. A nonconductive, nonmagnetic armature rotor 4 is mounted in a suitable housing and is adapted to be rotated by a shaft 8 coupled thereto. The shaft 8 in turn is driven by means of a squirrel cage induction motor, not shown, or by means of a gas turbine or other suitable device.

Mounted on the armature rotor 4 is an armature coil 5 which may, of course, be stranded and transposed as appropriate for the desired pulse frequency. The rotor 4, being nonconductive and nonmagnetic, allows rapid penetration of the field as the armature rotor coil 5 rotates. The field coils 2, 2' may be protected from the armature reaction by a stationary hollow cylindrical conducting shell 6 affixed to the stator. This is especially attractive when superconducting field coils are used as it eliminates discharge induced fields from the superconducting windings. An additional attraction for the use of superconducting coils over other alternator concepts is that the stationary field coils are not subject to centrifugal loading and do not require rotary liquid helium connections.

In operation of the device of FIG. 1, the armature rotor 4 is driven to design speed W (radians per second) (W × No. of Poles/$4\pi$ = pulse frequency in Hertz), and an external switch (see FIG. 3) such as a triggered spark gap, ignitron, SCR, etc. is closed at the appropriate time to produce a half sinusoidal pulse or portion thereof to thus provide the desired output current to an external circuit by means of suitable sliding contacts. The inertially stored energy in the rotor will be converted into the electrical energy required for the pulse and as the output current passes through zero a self-commutating effect is provided to allow the switch to disconnect the generator from the external circuit. It is an important feature of the device that the rotor need not stop at the end of the pulse to produce the current zero or reversal as is necessary with a homopolar generator. This becomes particularly attractive as higher repetition rates are contemplated since the relatively small speed variation possible during the pulse makes it practical to use an inexpensive prime mover which is directly coupled to the armature rotor.

The nonmagnetic, electrically nonconductive rotor not only allows the rapid field penetration as mentioned above but also ensures a low eddy current loss necessary for efficient high speed pulsed operation. A typical construction for the rotor coil 5 might be a water or gas cooled copper conductor wrapped in a graphite filament reinforced epoxy matrix. Such lightweight construction would ensure that the majority of the rotor's kinetic energy would be stored in the copper conductor where the discharge forces are generated, thus minimizing discharge stresses on the rotor.

Figure 2:
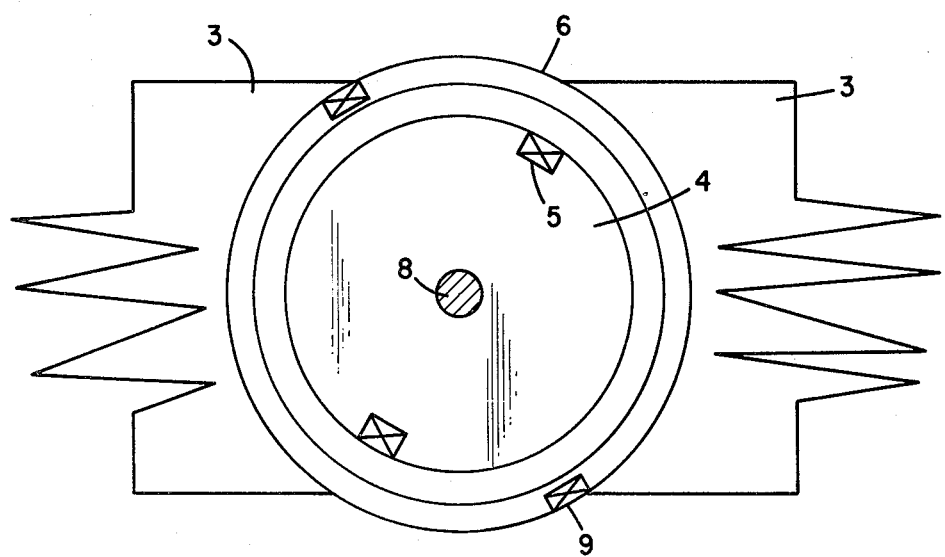
FIG. 2 is a schematic sectional view of a portion of the device of FIG. 1 and further including a stationary compensating coil.

FIG. 2 illustrates a modification of the device of FIG. 1, wherein a stationary compensating coil 9 is connected electrically in series with the armature coil 5. The coil 9 is mounted securely to the hollow conductive shield 6 and thus to the stator. The compensating coil 9 would generally have the same number of turns as the armature coil 5 (though in special cases it may have more or fewer turns in order to produce a special effect) and would be wound in the opposite direction. Such a coil would minimize the internal inductance of the alternator at the moment of maximum output in order to maximize the transfer of energy to the external circuit and would utilize the output current to enhance the magnetic field cut by the armature coil in order to increase the alternator's output voltage. Since it can compensate almost the entire armature reaction because of the short angular span described by the machine rotor during the discharge pulse, the compensating coil would sustain the entire discharge torque and thus must be securely anchored.

Figure 3:
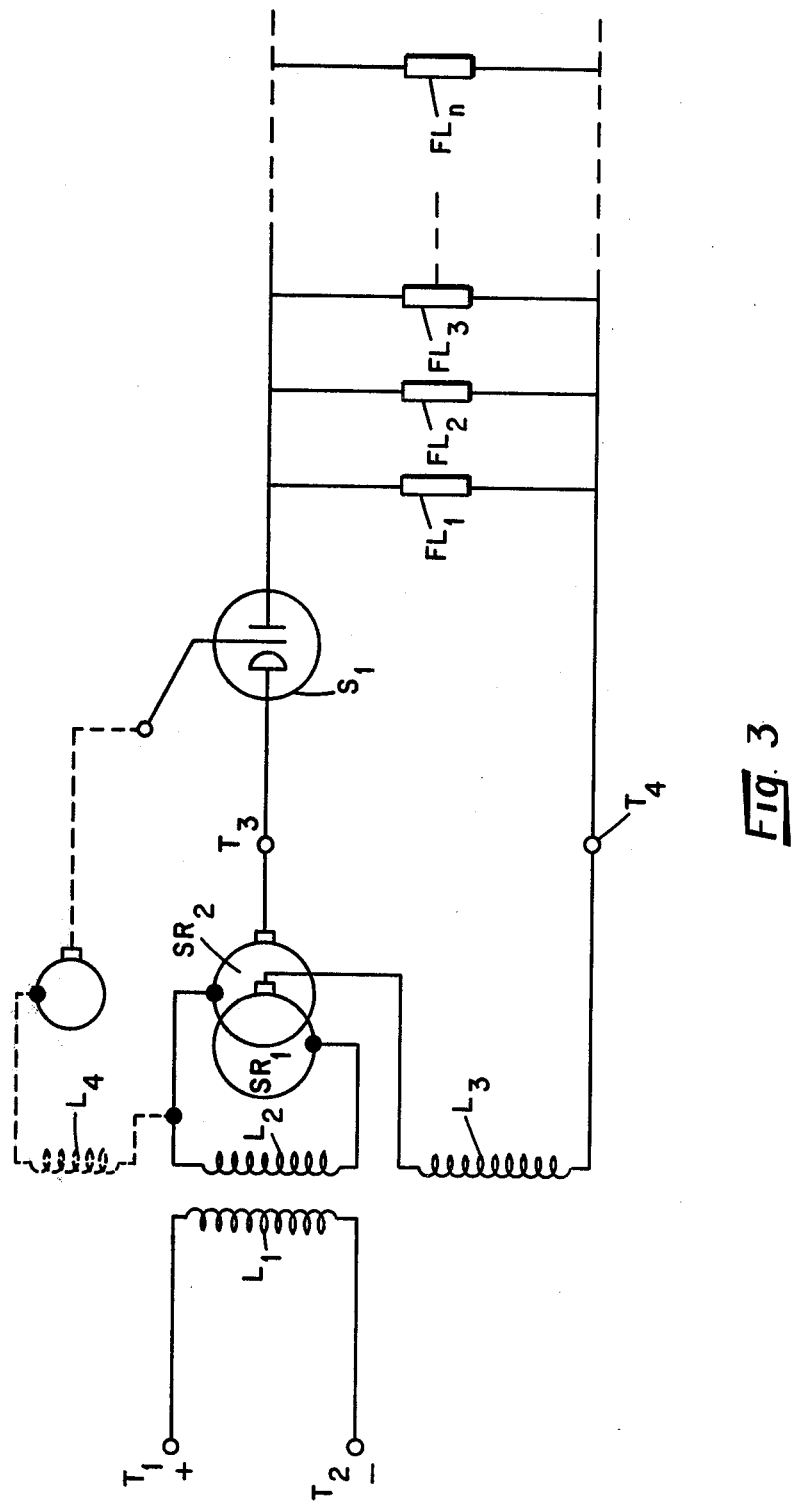
FIG. 3 is a schematic wiring diagram for use with the embodiment of FIG. 2.

FIG. 3 illustrates a schematic wiring diagram for the alternator embodiment of FIG. 1 as modified by FIG. 2, wherein $L_1$ is the externally excited stationary field coil; $L_2$ is the rotating armature coil; $L_3$ is the stationary compensating coil; $SR_1$ and $SR_2$ are slip rings, $T_1$, $T_2$ are the field coil excitation terminals; $T_3$, $T_4$ are the alternator output terminals; $FL_1$, $FL_2$, ... $FL_n$ are the load (flashlamps, for example); and $S_1$ is a triggered spark gap or SCR switch. The unit $S_1$ may be triggered by an auxiliary rotor coil $L_4$, by an angular position detector on the shaft, or by a rising voltage level at the output terminals $T_3$, $T_4$, for example.

The devices of FIGS. 1 and 2 relate to a two-pole alternator. However, the present invention also includes multi-pole embodiments to be described hereinbelow. The normal advantages of multi-pole configurations accrue to such devices, namely increasing the number of poles results in a reduction in shaft speed for the same output pulse, a reduction in total magnetic field energy required by directing flux only through the armature coils and not through the center portion of the rotor, a simplification of rotor construction especially in the armature coil end turns, and a more uniform distribution of coil mass and discharge forces around the rotor periphery.

Figure 4:
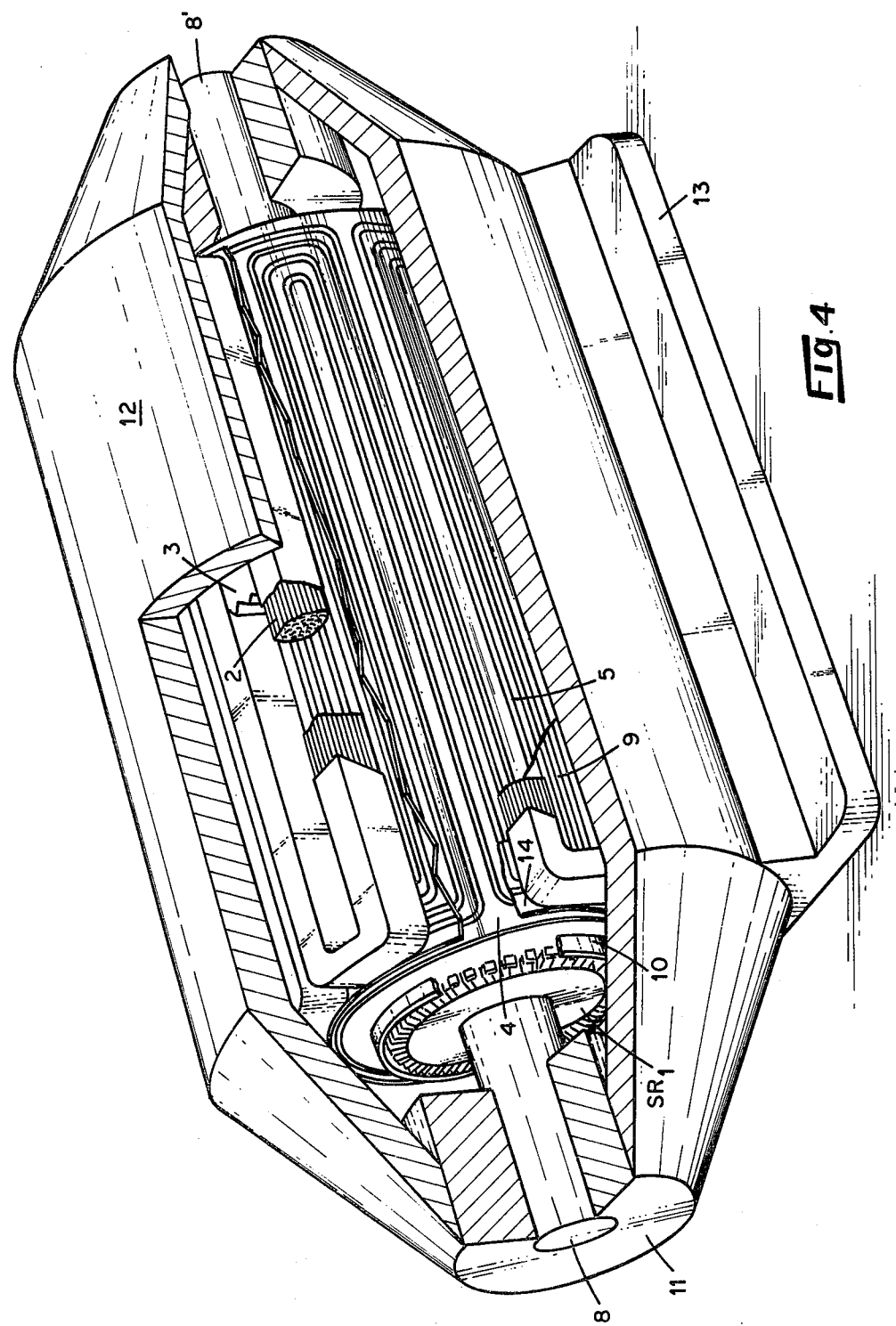
FIG. 4 is an isometric, cut-away view of another embodiment of the present invention wherein the compensating coil is adapted to be either stationary or counterrotated with respect to the rotor coil.

FIG. 4 illustrates another embodiment of the present invention utilizing a multi-pole configuration.

In FIG. 4, a base member 13 supports a backiron member 12. Mounted within the member 12 are a pair of bearings 11 which support the drive shaft 8. Coupled to the shaft 8 is the nonmagnetic, nonconductive rotor 4 upon which is mounted the armature coil 5. A cylindrical conductive shield 14 is mounted in spaced relation to the rotating rotor 4 and the compensating coil 9 is mounted on this shield 14. It should be understood that the shield 14 may be stationary, or alternatively it may be counterrotated with respect to the rotor 4. In the latter case, the shield may be mounted to a suitable end plate, not shown, and rotated by the shaft 8'. A slip ring $SR_1$ is mounted on the shaft 8 and a plurality of brushes 10 are associated with this slip ring. Another slip ring, not shown, is mounted on the shaft 8', and it is also associated with another set of brushes, not shown.

A plurality of field windings 2 and respective associated pole-pieces 3 are mounted to the inside wall of the backiron member 12 and in spaced relation to the shield 14, to thus complete the multi-pole compensated pulse alternator of this figure.

Figure 5:
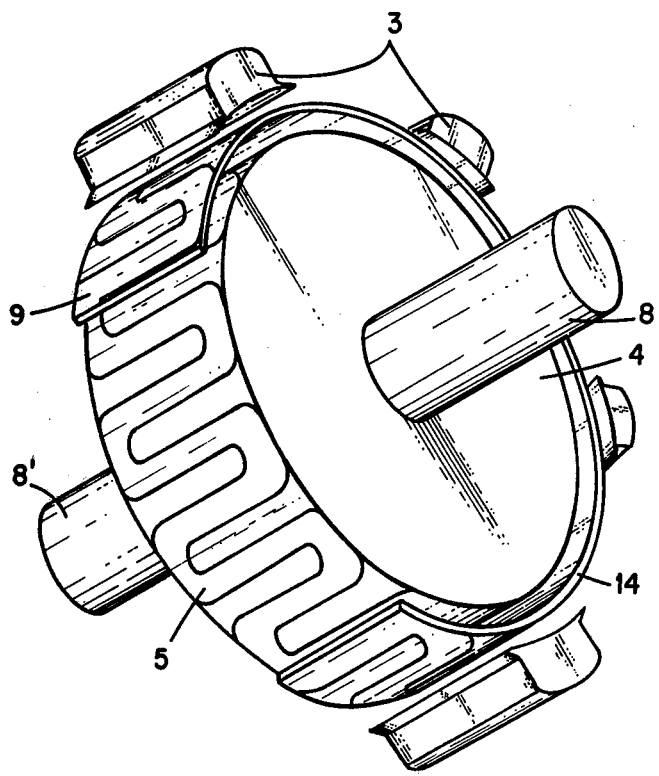
FIG. 5 is an isometric, cut-away view of still another embodiment of the present invention which is a counterrotating drum type compensated pulsed alternator.

In FIG. 5 there is illustrated a counterrotating drum-type compensated pulsed alternator, wherein the nonmagnetic, nonconductive rotor 4 is coupled to a driving shaft 8, and the rotor 4 has the armature rotor coil 5 mounted thereon. The hollow conductive shield 14 has the compensating coil 9 mounted thereon and the shield 14 is adapted to be counterrotated with respect to the rotor 4 by means of a driving shaft 8' coupled to the shield. It can be seen that six polepieces are provided, only four of which are shown on the drawing, and the associated stationary field coils are not shown for the sake of clarity. It should be understood that necessary slip rings and brushes, not shown, are provided for the device of FIG. 5. By providing counterrotating coils, as in FIG. 5, this permits a doubling of the voltage for the same voltage to be obtained with half of the number of conductors ($\frac{1}{4}$ of the inductance). Furthermore, the counterrotating coils 5, 9 make possible faster pulses ($dL/dt$, the time rate of change in inductance, is doubled) and the reaction torque (which can be very large for fast, high power pulses) is also compensated and need not be dealt with outside of the device.

It should be understood that the device of FIG. 5 is not limited to the illustrated structure. For example, the rotor (drum) 4 may be replaced with a hollow cylindrical shell upon which the coil 5 may be replaced with a hollow cylindrical shell upon which the coil 5 may be affixed, and providing suitable lightweight spokes which are affixed between such a shell and the driving shaft 8, thus substantially reducing the mass of the rotor 4. Also, the shafts 8 and 8' may be made hollow and a central, stationary solid ferromagnetic cylinder, or rod, may be positioned within each of such hollow shafts with suitable bearings therebetween. By providing such modifications to the device of FIG. 5, there results a device in which the field power requirements are reduced, and field fringing is minimized thus eliminating core losses and reducing the inertia of the rotating components.

Figure 6:
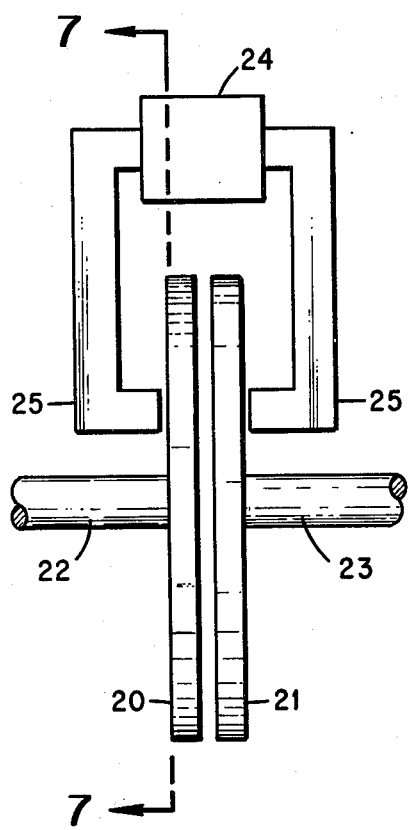
FIG. 6 is a sectional view of yet another embodiment of the present invention illustrating a disk-type compensated pulsed alternator.
Figure 7:
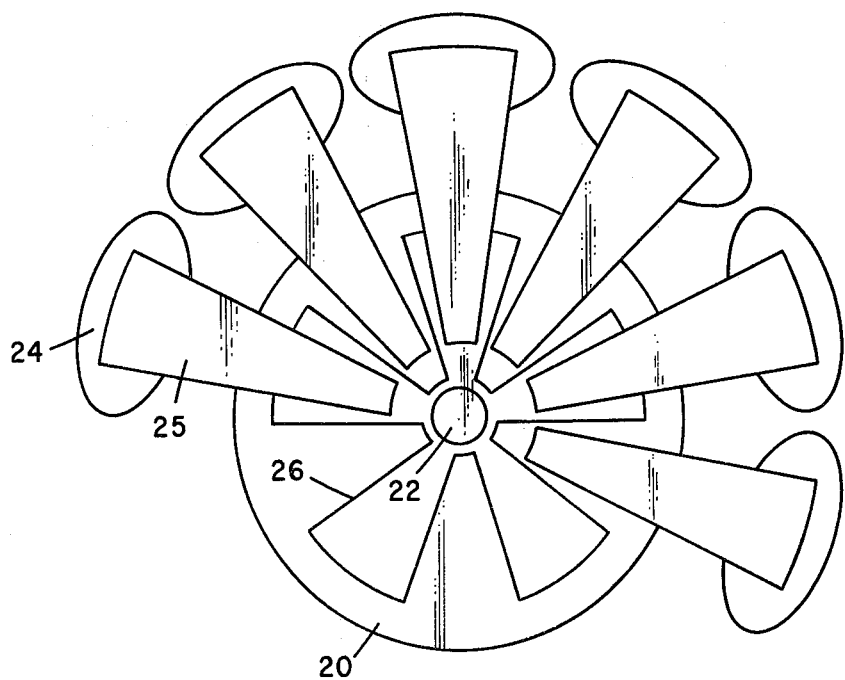
FIG. 7 is a sectional view along the line 7—7 of FIG. 6.

FIGS. 6 and 7 illustrate still another embodiment of the present invention which shows a disk equivalent. In FIG. 6, two counterrotating rotors or disks 20 and 21 are provided. Disk 20 is nonmagnetic and nonconductive and is adapted to be rotated in one direction by a driving shaft 22 coupled thereto, and the disk 21 is adapted to be rotated in the opposite direction by a driving shaft 23 coupled thereto. A plurality (10, for example) of stationary field coils 24 are provided with each of the coils 24 provided with a pair of polepieces 25. Only one field coil 24 and its associated pair of polepieces 25 are shown in FIG. 6 for the sake of clarity, and only 6 of the field coils 24 and 6 polepiece legs 25 are shown in the sectional view of FIG. 7 for the sake of clarity.

Mounted on the face of the disk 20 (see FIG. 7) is an armature conductor coil 26, and a like compensating coil, not shown, is mounted on the face of the disk 21. It should be understood that appropriate slip rings and respective associated brushes, not shown, are provided. It should be understood that the disk 21 may be held stationary if such is desired, but preferably both disks 20 and 21 are counterrotated.

The alternator of FIGS. 6 and 7 has certain advantages. For example, rotating mass is minimized, the air gap does not vary with speed (due to rotor growth), and rotor heating and losses due to field diffusion and eddy currents can be minimized.

The above described embodiments have been described for use with nonmagnetic and nonconductive rotors. However, for slower pulses ($\frac{1}{2}$ to 1 msec.) the rotor need not be nonmagnetic but rather may be composed of thin steel laminations similar to those used in conventional motors, generators, and transformers. This in no way alters the principle of operation of the device, but simply reduces the required field power at the expense of some rotor heating and rotational losses as well as slightly increased inductance of the armature circuit. Of course, for faster pulses, the nonmagnetic rotor configurations described above are still preferable.

This invention has been described by way of illustration rather than by limitation and it should be apparent that it is equally applicable in fields other than those described.

What is claimed is:

1. A pulsed alternator for sequentially supplying short duration, high power pulses of electrical power to a load circuit, said alternator comprising a rotor; an armature coil mounted on the outer periphery of said rotor; a stator provided with polepieces, said polepieces positioned adjacent to said rotor; a plurality of stationary field coils coupled to said stator; means coupled to said rotor for rotating it at a desired speed; a conductive shield positioned between said stator and said rotor, said armature coil adapted to convert electrical energy therein as supplied by said field coils through said polepieces during the rotation of said rotor; a slip ring and brush means assembly for coupling said armature coil to said load circuit; and an external, trigger switch coupled between said armature coil and said load circuit, said switch adapted to be periodically and sequentially closed and opened to provide said pulses to said load circuit.

2. The alternator set forth in claim 1, wherein said rotor is composed of laminated ferromagnetic material in order to minimize required field power at the expense of pulse speed and rotor core losses.

3. The alternator set forth in claim 1, wherein said rotor is composed of nonconductive, nonmagnetic material.

4. The alternator set forth in claim 3, and further including a compensating coil securely affixed to said shield, said compensating coil being connected in series with said armature coil and wound in the opposite direction thereto, said compensating coil minimizing the internal inductance of said alternator at the point of maximum output in order to maximize the transfer of energy to said load circuit and also providing an increase in the alternator's output voltage.

5. The alternator set forth in claim 4, wherein said shield is securely mounted to said stator and is thus stationary, and the compensating coil is provided with the same number of turns as said armature coil.

6. The alternator set forth in claim 4, wherein said alternator is a two-pole device.

7. The alternator set forth in claim 4, wherein said alternator is a multi-pole device.

8. The alternator set forth in claim 4, wherein said shield is spaced from said stator, and additional means is provided and is coupled to said shield for counterrotating it with respect to said rotor, and a second pair of slip rings and brush assemblies is provided for effecting the connection of said compensating coil in series with said armature coil.

9. The alternator set forth in claim 8, wherein said alternator is provided with multi-pole field coils to thus constitute a multi-pole device.

10. The alternator set forth in claim 9, wherein said rotor and said conductive shield are separated flat facing disks with said armature coil and said compensating coil being mounted on the respective outer faces of said disks.

11. The alternator set forth in claim 8, wherein said load circuit comprises a plurality of flashlamps connected in parallel with the output of said alternator through said trigger switch.

12. The alternator set forth in claim 9, wherein said rotor and said shield are counterrotating cylindrical shells upon which said respective armature coil and compensating coil are mounted, said respective means for rotating said shells are hollow driving shafts, and further including a respective central, stationary solid ferromagnetic cylinder positioned within each of said hollow driving shafts, thereby reducing field power requirements and minimizing field fringing while at the same time eliminating core losses and reducing the inertia of the counterrotating shells.

* * * * *